United States Patent [19]
Guillot

[11] Patent Number: 5,203,601
[45] Date of Patent: Apr. 20, 1993

[54] FRAME AND COVER FOR WHEELED VEHICLE

[76] Inventor: Wilmer E. Guillot, Rte. 1, Box 68C, Gilbert, La. 71336

[21] Appl. No.: 858,035

[22] Filed: Mar. 26, 1992

[51] Int. Cl.⁵ .............................................. B60J 1/04
[52] U.S. Cl. .................................. 296/77.1; 296/102
[58] Field of Search ................ 296/102, 77.1, 79, 80, 296/203

[56] References Cited
U.S. PATENT DOCUMENTS

| | | | |
|---|---|---|---|
| 4,014,589 | 3/1977 | Yerkey | 296/78 |
| 4,301,955 | 11/1981 | DeFever | 296/102 X |
| 4,336,964 | 6/1982 | Pivar | 296/77.1 |
| 4,773,694 | 9/1988 | Gerber | 296/77.1 |
| 4,950,017 | 8/1990 | Norton | 296/102 |

Primary Examiner—Robert R. Song
Attorney, Agent, or Firm—John M. Harrison

[57] ABSTRACT

A rigid frame and flexible, optionally removable cover for wheeled hunting and recreational vehicles, including balloon tire, three and four wheel vehicles, which frame further includes frame floorboards. The vehicle top can be either removably or permanently attached to the vehicle and the frame includes removable, hinged doors having pivoting, transparent side window panels. In a preferred embodiment the cover is attached to the frame by snap fasteners and the frame is constructed in several segments which are assembled on the wheeled vehicle.

25 Claims, 2 Drawing Sheets

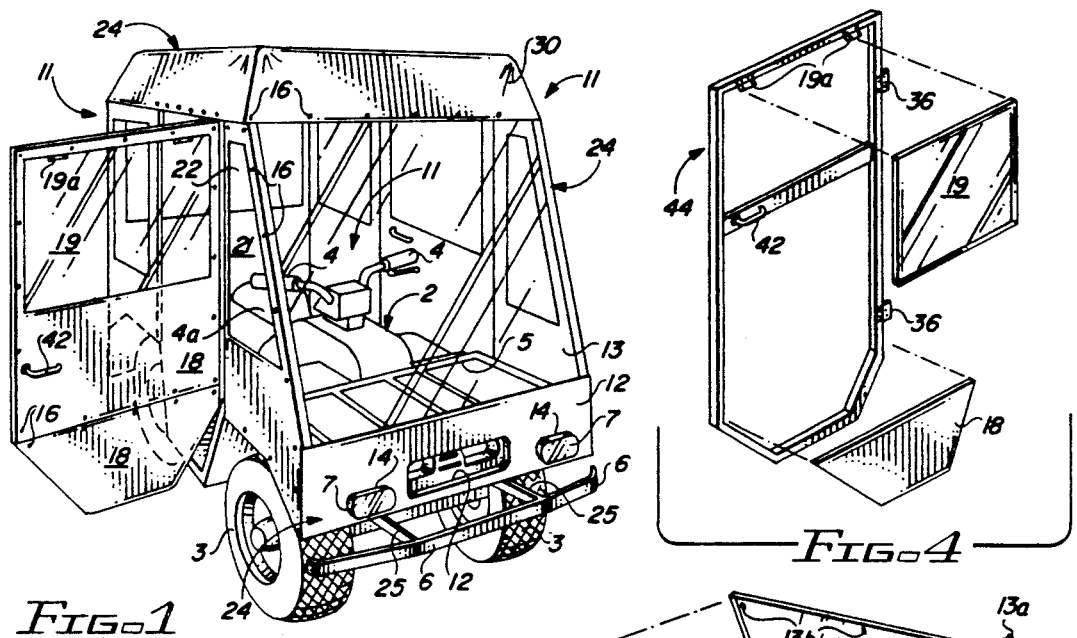
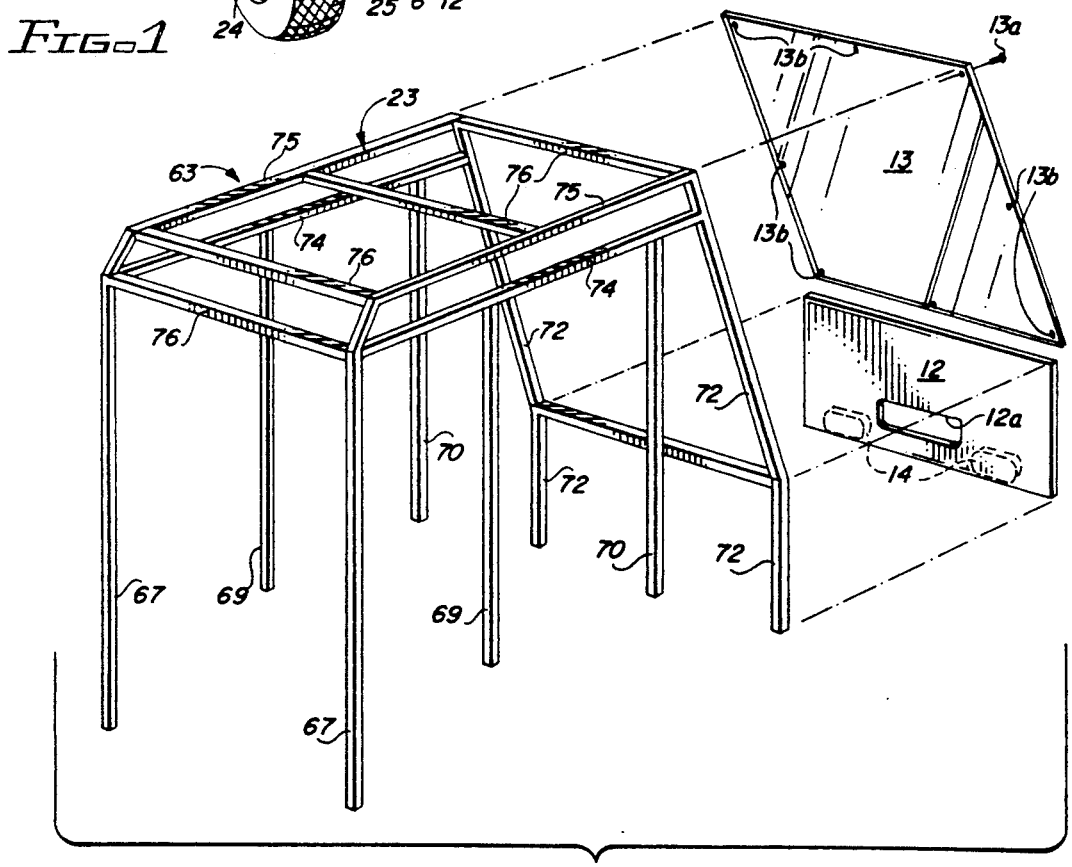

FRAME AND COVER FOR WHEELED VEHICLE

BACKGROUND OF THE INVENTION

1. Field of the Invention

This invention relates to hunting and recreational vehicles and more particularly, to a frame adapted for attachment to hunting and recreational vehicles and a cover removably secured to the frame and designed to enclose and protect the driver of the vehicle. The vehicle frame and cover of this invention is further characterized by a rigid metal cage or top frame having removable doors, complete with pivoting side window panels, as well as floorboards and a removable, flexible cover, with a windshield and rear window panel. The frame is designed to removably or fixedly mount to substantially any hunting vehicle, including three-wheel and four-wheel versions of the popular balloon tire, all-terrain vehicles well known to hunters and sportsmen. The frame and cover is light in weight and versatile and in a preferred embodiment, the flexible cover is provided with snaps or other fasteners for removable attachment to corresponding receiving snap members attached to the frame. The cover can therefore be quickly and easily removed from the frame, as desired. The wheeled vehicle can be located at a selected spot in a hunting area and the pivotally-mounted, transparent side windows in the doors raised in functional deployment to enable hunting directly from the vehicle.

2. Background Information

Various structures for covering vehicles are known in the art. U.S. Pat. No. 2,463,646, dated Mar. 8, 1949, to N. A. Schassberger, discloses a "Vehicle Top Construction" for a vehicle such as a jeep. The patent includes a top and closure construction for a vehicle which features several component elements that may be quickly and readily assembled on the vehicle and are easily removed therefrom without the use of special tools. The vehicle top construction is formed of an assemblege of interchangeable components which may be disassembled from a top supporting position and stored in the vehicle body in various positions, where they are readily accessible for reassembly. A "Mobile Scaffold" is disclosed in U.S. Pat. No. 3,556,249, dated Apr. 10, 1969, to Clarence G. Jackson. The Jackson mobile scaffold includes a vehicle-mounted platform which can be elevated to a work position and forms the roof of a vehicle over the driver's seat when the scaffold is not in use. An upper section of the scaffold telescopes within an intermediate section, which intermediate section in turn telescopes within a lower section under the control of a special power-driven cable and pulley system. U.S. Pat. No. 3,599,740, dated Aug. 17, 1971, to Werner W. Martinmaas, discloses a "Snowmobile Cab Assembly". The snowmobile cab assembly is said to be adapted for use on all snowmobile models and includes a slidable cab mounted on a frame attached to the snowmobile, with the cab frame and the mounting frame providing a roll bar structure for safety purposes. The cab assembly is detachable and serves to mount the windshield for the snowmobile in an alternative embodiment of the patent. U.S. Pat. No. 2,423,748, dated Jul. 8, 1947, to E. Acheson, details a "Collapsible Top for Vehicles". The collapsible top includes an improvement in folding frames and curtains for vehicles such as tractors which are normally operated under conditions which demand a clear unrestricted view in every direction. U.S. Pat. No. 2,682,427, dated Jun. 29, 1954, to W. Bright, details a "Removable Collapsible Vehicle Door Construction" for jeeps and other vehicles, the door of which is hinged to the body in a removable fashion to facilitate removal of the door from the body with minimal effort. A "Golf Car Raincoat" is detailed in U.S. Pat. No. 3,709,553, dated Jan. 9, 1973, to Charles W. Churchhill, et al. The roofed golf car has a passenger compartment weatherproofed by a pair of flexible transparent plastic curtains. Each curtain is supported by channel-shaped guide member, one on each side of the car, and each curtain is slidable on its guide member. Each guide member has multiple supports connected to the car roof and each curtain may be compressed into a bundle at one side of the car when not in use. A special curtain is provided to cover the conventional club compartment of the car during rainstorms. U.S. Pat. No. 4,013,315, dated Mar. 22, 1977, to George L. West, details a "Rain Curtain Assembly for Golf Carts". The rain curtain assembly includes multiple panels which are attached to the surface of the cart by a combination of suction cups and hook mechanisms. Tie cords are provided for securing the panels to each other to prevent entry of rain and wind into the passenger compartment of the car. U.S. Pat. No. 4,098,536, dated Jul. 4, 1978, to Marion T. Mills, details a "Weathershield for Golf Carts". A flexible sheet of at least partially transparent, water-repellent material is constructed to fit over the roof or canopy and sides of the golf cart for enclosure during inclement weather. An access is provided through the sidewall part for ingress and egress and when not in use, the weathershield may be removed from the cart, folded and stored in a pouch. U.S. Pat. No. 4,621,859, dated Nov. 11, 1986, to Kenneth N. Spicher, details a "Weathershield for Golf Carts and a Method for Enclosing a Golf Cart". The weathershield includes in combination a pipe frame mounted on the golf cart, the pipe frame having a roof defined by a front pipe, a back pipe and a pair of side pipes secured to the front pipe and to the back pipe. The weathershield includes a first sheet of flexible, water-repellent material shaped in a configuration which includes a top wall having outer dimensions at least equal to the outer dimensions of the roof of the pipe frame and a front and rear wall depending downwardly from the outer edges of the top wall portion and of sufficient length to respectively detachably fasten to the front and rear of the golf cart for enclosing the golf cart. The front wall includes a first transparent portion for visibility in guiding the golf cart and a pair of doors are easily removably secured to the pair of front upright support pipes by hinges having easily removable pins. A "Protective Cover For A Forklift Truck" is detailed in U.S. Pat. No. 4,652,037, dated Mar. 24, 1987, to Herbert F. Thau, et al. The protective cover includes a top panel which overlies the roof of the forklift truck and further includes front, rear and side wall panels depending from the top panel and secured thereto, as well as to each other, by edge seams. The side panels include roll-up doors and the front and rear panels include windows. Flaps are provided over the windows and straps depend from the top panel inside of the doors and flaps. Doors and flaps can be rolled up from the outside with the straps wrapping around them and secured onto fasteners provided on the top panel to hold the doors and windows in an open condition. U.S. Pat. No. 4,773,694, dated Sep. 27, 1988, to Curtis E. Gerber, details a "Golf Cart Enclosure". The golf cart enclosure includes a roof panel having a configuration corresponding to the configuration of the roof structure of the golf cart and front and rear and side panels suspended from the roof panel about the periphery of the golf cart to completely enclose the golf cart. The roof panel of the enclosure includes a peripheral hem which allows each panel suspended therefrom to be folded and rolled upwardly and then tucked under the roof panel. The peripheral flap is then fastened to the rim of the roof structure of the golf cart. French Patent No. 2,543,891 details a "Temporary Cover for a Vehicle Body" which includes ducts made of flexible metal or plastic sheet removably mounted on body panels. The ducts are complete with semi-conical recesses, the bases of which are open and extend toward the rear. The mountings may have push buttons which engage the vehicle or, alternatively, straps may be used to secure the cover on the vehicle body.

A well known problem which exists in the use of uncovered hunting vehicles and the three and four-wheel, balloon tire, hunting vehicles in particular, is exposure of the driver to the elements, as well as the danger of turnover. These vehicles are designed for operation in the manner of a motorcycle and usually do not even incorporate a windshield for protection of the driver. Furthermore, mud and water splash upwardly from the front wheels on the operator, adding to the discomfort of travel, especially on a cold outing. Accordingly, it is an object of this invention to provide a frame and cover for wheeled hunting and sports vehicles such as three and four wheel, balloon tire vehicles, as well as golf carts.

Another object of this invention is to provide a new and improved frame and flexible cover for hunting and sports vehicles, which frame can either be removably or permanently mounted to the vehicle and includes floorboards and pivoting, transparent side panel windows in the doors, which open to facilitate use of the vehicle as a hunting blind.

Yet another object of this invention is to provide a new and improved frame and flexible cover for mounting on all terrain vehicles, which frame includes a metal cage, complete with floorboards, enclosing the vehicle operator and a flexible cover mounted thereon by means of snaps, the frame further including a pair of removable doors, transparent windshield and rear window panel and pivoting transparent side panel windows located in the doors.

Still another object of the invention is to provide a substantially rigid frame and cover for balloon tire, three-wheel and four-wheel hunting vehicles and other sports vehicles such as golf carts, which frame is characterized by a multiple segment, rigid metal cage or frame surrounding the driver, floorboards built into the cage or frame to reduce water and mud spatter and removable, vinyl-covered, latch-equipped doors removably hinged to each side of the frame to facilitate access to the controls of the vehicle.

Another object of this invention is to provide a segmented, substantially rigid vehicle frame which can be adapted, bolted or welded to a three or four wheel hunting or sports vehicle of any design, which frame is further characterized by a bottom frame member, floorboards mounted on the bottom frame member, side frame members upward-standing from the bottom frame member, a top frame member mounted on the side frame members, doors hinged to the side frame members, pivoting transparent side windows mounted on the doors and a vinyl top fitted with a transparent windshield and rear window and snap fasteners for removable mounting on corresponding snap receptacles the respective frame members.

A still further object of this invention is to provide a new and improved vehicle top frame and removably attached flexible cover for enclosing the operator of three wheel and four wheel balloon tire hunting and recreational vehicles, which frame is characterized by a shaped metal cage capable of being assembled and removably or permanently mounted to the vehicle and further including a pair of folding, transparent side windows pivotally mounted on door panels hinged to the top frame and extendible in functional hunting configuration and foldable against the door frames in non-functional, travelling configuration.

SUMMARY OF THE INVENTION

These and other objects of the invention are provided in a vehicle top for hunting and recreational vehicles and particularly for three and four wheel, balloon tire, hunting and all terrain vehicles, which top includes a substantially rigid cage or frame constructed of frame segments surrounding the operator of the vehicle and having floorboards and a pair of door frames removably hinged thereto, with a flexible cover removably snapped to the frame and covering the door frames, a transparent windshield and rear window and a pair of transparent side window panels adapted for hinged upward extension to provide openings in the doors for shooting game, and folding against the doors when in non-functional, travelling configuration.

BRIEF DESCRIPTION OF THE DRAWINGS

The invention will be better understood by reference to the accompanying drawings, wherein:

FIG. 1 is a perspective view of a preferred embodiment of the frame and cover wheeled vehicle top of this invention mounted on a four-wheeled vehicle;

FIG. 3 is a perspective exploded view of the top frame illustrated in FIG. 2, with the flexible top or cover removed; and FIG. 4 is a perspective, exploded view of a typical door frame and transparent window assembly.

DESCRIPTION OF THE PREFERRED EMBODIMENTS

Figure 2:
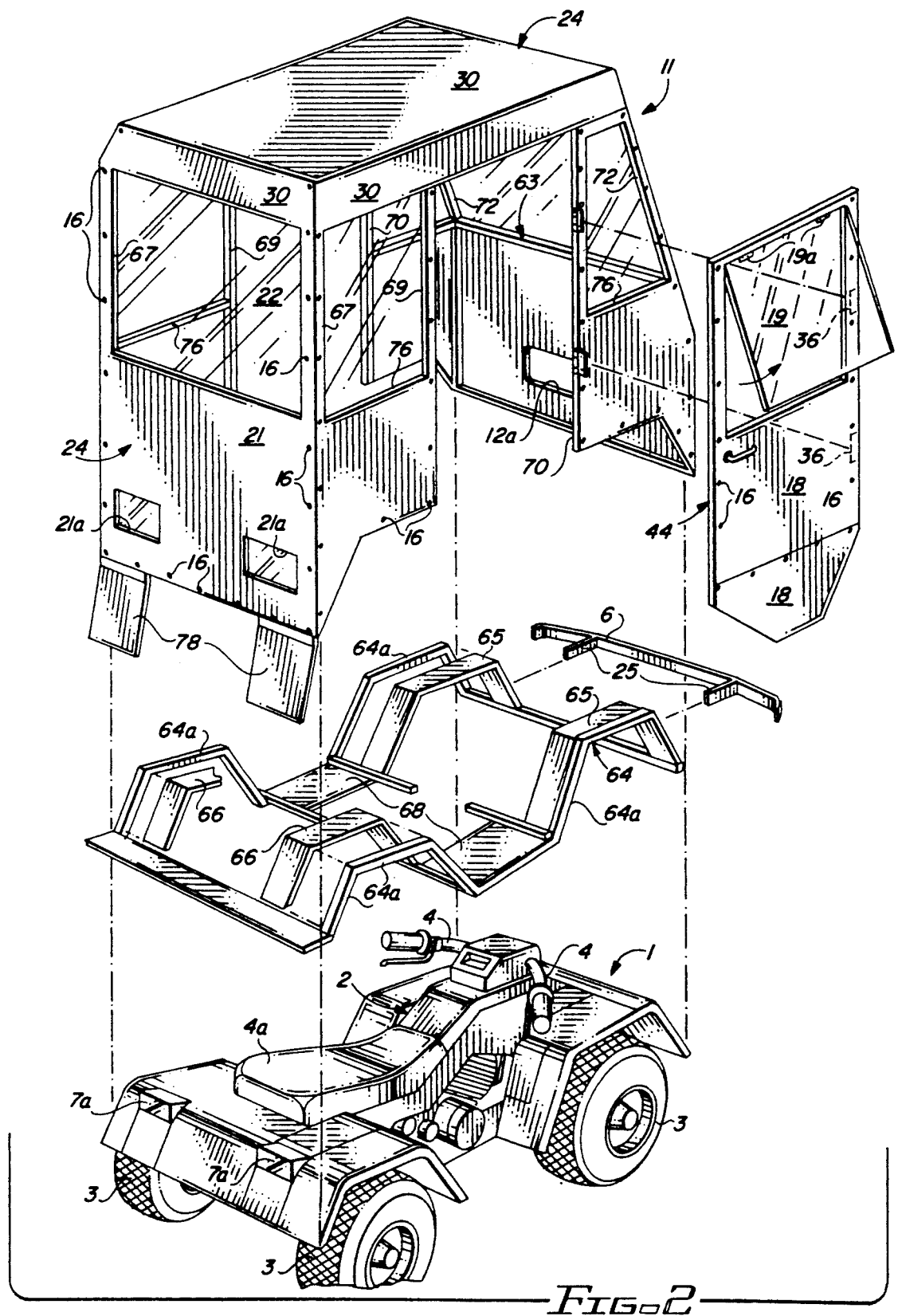
FIG. 2 is a perspective, exploded view of the top frame, cover and four-wheeled vehicle illustrated in FIG. 1.

Referring to FIGS. 1–4 of the drawings, the vehicle top of this invention is generally illustrated by reference numeral 11 and is secured to the vehicle frame 2 of a wheeled vehicle 1, having a seat 4a and balloon tires 3, steered by handlebars 4. The vehicle top 11 is characterized by a flexible cover 24, having a front cover 12, which is constructed of a flexible plastic material such as vinyl and is further provided with a clear plastic windshield 13, a front cover opening 12a and twin headlight openings 14, to facilitate projection of the beams of a pair of headlights 7, forwardly of the wheeled vehicle 1. Door covers 18 are provided on rigid door frames 44, fitted with window hinges 19a for hanging cooperating hinged, transparent plastic side windows 19, as is more particularly illustrated in FIGS. 1 and 4. A rear cover 21 serves as the rear panel of the flexible cover 24 and is fitted with a clear plastic rear window 22, to complete a clear view in all four directions from the interior of the vehicle top 11, as well as taillight openings 21a, for viewing the taillights 7a on the wheeled vehicle 1. A top cover 30 completes the flexible cover 24.

Referring now to FIGS. 2-4 of the drawings, and initially to FIGS. 2 and 3, the vehicle top 11 is supported on the wheeled vehicle 1 as follows: a bottom frame 64, bordered by a stiffener 64a, is bolted or otherwise mounted on the vehicle frame 2 of the wheeled vehicle 1 and includes a front bumper 6, supported by bumper supports 25. A pair of front fender covers 65 and rear fender 66, as well as floorboards 68, are welded to front and rear segments, respectively, of the bottom frame 64 for stiffening the bottom frame 64 and protecting the balloon tires 3. In a preferred embodiment of the invention the stiffener 64a of the bottom frame 64 is constructed of tubular steel and the front fender covers 65, rear fender covers 66 and floorboards 68 are characterized by metal plates welded to the stiffener 64a. A top frame 63 includes a pair of rear supports 67, rear door supports 69, front door supports 70 and front supports 72, which extend upwardly from welded or bolted attachment to the stiffener 64a of the bottom frame segment 64 and are spaced by parallel top door supports 74 and top frame segments 75. Frame struts 76 connect the parallel top door supports 74 and top frame segment 75 and extend between the rear supports 67 and rear door supports 69, as well as the front door supports 70, and front supports 72, to stiffen the top frame 63, as illustrated.

Referring now to FIGS. 2 and 4, a pair of door hinges 36 serve to secure each of the door frames 44 to the front door supports 70. Conventional door handles 42 are mounted on the respective door frames 44 for accessing the interior of the vehicle top 11. The door frames 44 can then be closed against both sides of the top frame 63 by manipulation of the door handles 42, which are conventional in design.

It will be appreciated by those skilled in the art that the vehicle top 11 of this invention is characterized by great versatility, in that it can be modified to fit substantially any wheeled vehicle 1, regardless of design or intended use. Accordingly, a conventional front rack 5, illustrated in FIG. 1, and rear rack (not illustrated) may be located on the vehicle frame 2, without impeding the fit of the vehicle top 11. Furthermore, since the frame elements of various wheeled vehicles may not be located in the same relative positions as illustrated in the drawings with regard to the illustrated wheeled vehicle 1, modifications can be easily made to the bottom frame 64 and top frame 63 to accommodate such additions and location differences. For example, the rear supports 67, rear door supports 69, front door supports 70 and front supports 72 can be of any selected length and may extend in any angular relationship with respect to the top door supports 74, top frame segment 75 and the bottom frame 64, in order to attach to a bottom frame 64 of alternative shape or location on the wheeled vehicle 1 in question. Furthermore, while attachment of the rear supports 67, rear door supports 69, front door supports 70 and front supports 72 to the top frame segment 75 and/or the bottom frame 64 are typically effected by welding, these connections may be made by means of bolts or clamps, further according to the knowledge of those skilled in the art.

It will also be appreciated by those skilled in the art that the structural components of the bottom frame 64 and top 63 frame can be fabricated of substantially any rigid material, including aluminum and steel, in non-exclusive particular. Furthermore, the bottom frame 64, stiffener 64a, rear supports 67, rear door supports 69, front door supports 70, front supports 72 and top frame segment 75, as well as the frame struts 76, can be fabricated of box or round tubing, as well as angle iron, as desired.

Referring again to FIG. 1 of the drawings, in yet another most preferred embodiment of the invention the front cover 12, door covers 18, top cover 30 and the rear cover 21 of the flexible cover 24 are fabricated of a flexible vinyl or equivalent plastic, canvas or cloth material, with snap fasteners 16 used for attachment to corresponding snap receptacles 16a, secured to the bottom frame 64, rear supports 67, rear door supports 69, front door supports 70, front supports 72, top door supports 74 and frame struts 76, respectively. Furthermore, the windshield 13, side window 19 and rear window 22 may be constructed of a transparent plastic material such as "Plexiglass" or the like, known to those skilled in the art, in order to insure good vision in all directions from the interior of the vehicle top 11. The windshield 13 may be typically secured to the front supports 72 by means of windshield screws 13a, inserted through screw openings 13b in the windshield 13, as illustrated in FIG. 3. It will be appreciated that the front cover 12, door covers 18, top cover 30 and rear cover 21 can be constructed of alternative resilient, water resistant materials which resist tearing and weathering, such as nylon, with nylon cord reinforcing, but the chosen material must be tough and preferably sufficiently flexible to allow folding. Furthermore, regardless of composition, the front cover 12 is most preferably removably secured to the front supports 72 by means of the snap fasteners 16 and snap receptacles 16a, although it will be recognized that a more permanent attachment can be made with other fasteners such as nuts and brads, in non-exclusive particular, according to the knowledge of those skilled in the art. Similarly, the rear cover 21 is likewise most preferably attached to the rear supports 67, the top cover 30 to the top door supports 74 and frame struts 76 and the door covers 18 secured to the door frames 44, respectively, by means of additional snap fasteners 16 and corresponding snap receptacles 16a.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. In a wheeled vehicle having operating controls and a vehicle frame, the improvement comprising a vehicle top characterized by a bottom frame member rigidly carried by the vehicle frame; floorboard means positioned between front and rear wheels of the vehicle and carried by said bottom frame member; a plurality of upright supports having one end attached to said bottom frame member and the opposite end of each of said upright supports terminating above the vehicle frame; a top frame member carried by said opposite end of said upright supports and flexible cover means extending substantially around said bottom frame member, said upright supports and said top frame member to substantially enclose the wheeled vehicle.

2. The vehicle top of claim 1 further comprising a front bumper carried by said bottom frame member.

3. The vehicle top of claim 1 further comprising transparent material provided in at least one area of said flexible cover means to define at least one window.

4. The vehicle top of claim 1 further comprising at least one door frame hingedly carried by selected ones of said upright supports.

5. The vehicle top of claim 1 further comprising at least one door frame hingedly carried by selected ones of said upright supports and a first length of flexible material covering said door frame.

6. The vehicle top of claim 4 wherein said at least one door frame further comprises a first door frame hingedly carried by a first pair of said upright supports and a second door frame hingedly carried by a second pair of said upright supports.

7. The vehicle top of claim 6 further comprising a first length of flexible material covering said first door frame and a second length of flexible material covering said second door frame.

8. The vehicle top of claim 3 wherein said transparent material further comprises a windshield.

9. The vehicle top of claim 5 further comprising a first area of transparent material provided in said flexible cover means to define a windshield and a second area of transparent material provided in said first length of flexible material to define a rear window.

10. The vehicle top of claim 9 further comprising headlight openings and taillight openings provided in said flexible cover means.

11. The vehicle top of claim 9 further comprising a first plurality of snap means provided on said bottom frame member, said upright supports and said top frame member and a first plurality of snap-receiving means provided on said flexible cover means for engaging said first plurality of snap means and removably securing said flexible cover means to said bottom frame member, said upright supports and said top frame member.

12. The vehicle top of claim 9 wherein said at least one door frame further comprises a first door frame hingedly carried by a first pair of said upright supports and a second door frame hingedly carried by a second pair of said upright supports further comprising a pair of transparent side windows hingedly carried by said first door frame and said second door frame, respectively.

13. The vehicle top of claim 12 further comprising a first length of flexible material covering aid first door frame and a second length of flexible material covering said second door frame and a second plurality of snap means provided on said first door frame and said second door frame and a second plurality of snap-receiving means provided on said first and second length of flexible material for engaging said second plurality of snap means and removably securing said first and second length of flexible material to said first door frame and said second door frame, respectively.

14. In a wheeled vehicle having a vehicle frame, a front vehicle bumper attached to the vehicle frame and a front rack and a rear rack attached to the vehicle frame, the improvement comprising a cover frame rigidly attached to the vehicle frame and projecting above the front bumper, front rack and rear rack of the wheeled vehicle, a pair of floorboards carried by said cover frame and located between the front and rear wheels, respectively, of the wheeled vehicle and a flexible cover substantially covering said cover frame, whereby said cover frame and said flexible cover extend around an operator of the wheeled vehicle.

15. The wheeled vehicle of claim 14 further comprising a pair of door frames hingedly and removably secured to said cover frame for ingress and egress to the wheeled vehicle.

16. The wheeled vehicle of claim 15 wherein said flexible cover further comprises a first length of flexible material attached to said cover frame; a second length of flexible material attached to one of said door frames; and a third length of flexible material attached to the other one of said door frames.

17. The wheeled vehicle of claim 16 further comprising headlight and taillight openings provided in said first length of flexible material.

18. The vehicle of claim 17 further comprising a first area of transparent material provided in said first length of flexible material above said headlight openings to define a windshield; a panel of transparent material hingedly connected to each of said door frames, respectively, to define door windows in said door frames; and a second area of transparent material provided in said first length of flexible material to define a rear window above said taillight openings.

19. The vehicle of claim 18 further comprising a plurality of snap means provided on said cover frame and said door frames and a plurality of snap-receiving means provided on said first length of flexible material, said second length of flexible material and said third length of flexible material for removably securing said first length of flexible material on said cover frame, said second length of flexible material on said one of said door frames and said third length of flexible material on said other one of said door frames.

20. In a wheeled vehicle having a vehicle frame, front and rear wheels provided on said vehicle frame and handle bars for steering, the improvement comprising a cover frame characterized by:
(a) a bottom frame rigidly carried by the vehicle frame and a pair of floorboards carried by said bottom frame between said front and rear wheels, respectively;
(b) a top frame spaced from said bottom frame;
(c) a pair of rear supports having one end fixedly secured to said bottom frame in spaced relationship, with the opposite ends of said rear supports fixedly attached to said top frame;
(d) a pair of rear door supports spaced from each other and said rear supports, respectively, and having one end fixedly carried by said bottom frame with the opposite ends of said rear door supports fixedly attached to said top frame;
(e) a pair of front door supports spaced from each other and said rear door supports, respectively, and having one end fixedly carried by said bottom frame, with the opposite ends of said front door supports fixedly attached to said top frame;
(f) a pair of front supports spaced from each other and said front door supports, respectively, and having one end fixedly carried by said bottom frame with the opposite ends of said front supports fixedly attached to said top frame; and
(g) a first door frame hingedly carried by a first one of said front door supports and closing against a first one of said rear door supports and a second door frame hingedly carried by a second one of said front door supports and closing against a second one of said rear door supports, whereby said cover frame substantially encloses an operator.

21. The vehicle of claim 20 further comprising a first length of flexible material removably attached to said bottom frame, said top frame, said rear supports, said rear door supports, said front door supports and said front supports; a second length of flexible material removably attached to said first door frame; and a third length of flexible material removably attached to said second door frame.

22. The vehicle of claim 21 further comprising first hinge means carried by said first door frame, a first window carried by said first hinge means, second hinge means carried by said second door frame and a second window carried by said second hinge means.

23. The vehicle of claim 22 further comprising first latch means carried by said first door frame and second latch means carried by said second door frame, said first latch means adapted for releasable cooperation with a first one of said rear door supports to close said first door frame and said second latch means adapted for releasable cooperation with a second one of said rear door supports to close said second door frame.

24. The vehicle of claim 23 further comprising a headlight opening and a taillight opening provided in said first length of flexible material and a first area of transparent material provided in said first length of flexible material above said headlight opening to define a windshield and a second area of transparent material above said taillight opening in said first length of flexible material to define a rear window.

25. The vehicle of claim 24 further comprising a plurality of snap means provided on said bottom frame member, said top frame member, said rear supports, said rear door supports, said front door supports, said front supports and said door frames and a plurality of snap-receiving means provided on said first length of flexible material, said second length of flexible material and said third length of flexible material for securing said first length of flexible material on said bottom frame member, said top frame member, said rear supports, said rear door supports, said front door supports and said front supports, said second length of flexible material on first door frame and said third length of flexible material on said second door frame.

* * * * *